United States Patent [19]

Jones

[11] Patent Number: 5,001,375
[45] Date of Patent: * Mar. 19, 1991

[54] D. C. ELECTRIC MOTOR

[76] Inventor: Gareth Jones, 18 The Links, Amlwch, United Kingdom

[ * ] Notice: The portion of the term of this patent subsequent to Oct. 10, 2006 has been disclaimed.

[21] Appl. No.: 391,795

[22] Filed: Aug. 9, 1989

Related U.S. Application Data

[63] Continuation of Ser. No. 52,045, filed as PCT GB86/00501 on Aug. 22, 1986, published as WO87/01247 on Feb. 26, 1987, Pat. No. 4,873,463.

[30] Foreign Application Priority Data

Aug. 22, 1985 [GB] United Kingdom ............... 8521009

[51] Int. Cl.⁵ .......................................... H02K 23/16
[52] U.S. Cl. .................................. 310/68 B; 310/177; 318/439; 318/138
[58] Field of Search ...................... 318/138, 254, 439; 310/46, 68 R, 68 B, 177, 179

[56] References Cited

U.S. PATENT DOCUMENTS 1,655,286  1/1928  Nietsche .................... 310/40 R
3,546,507 12/1970  Wiegel ...................... 310/156
3,631,273 12/1971  Stein ........................... 310/46
4,135,107  1/1979  Kammerbeck et al. ...... 310/179
4,321,494  3/1982  MacNab .................... 310/179

FOREIGN PATENT DOCUMENTS 2028598  3/1980  United Kingdom .

Primary Examiner—Steven L. Stephan
Assistant Examiner—Judson H. Jones
Attorney, Agent, or Firm—Tarolli, Sundheim & Covell

[57] ABSTRACT

In a d.c. motor, the stator may form the armature and has its windings inserted in slots in its cylindrical surface and the rotor may comprise a permanent magnet or be provided with d.c. windings. Switching means operate in synchronism with rotation of the rotor to connect a d.c. source to the armature windings so that a rotating field is produced in arrears of the rotor field to exert a repelling force on the rotor poles. Because the rotor and stator fields are in opposition, rather than in mutual assistance, less energy is needed to energize the windings to produce a given torque. Also the current in each winding is very low when commutation occurs and sparking avoided.

8 Claims, 4 Drawing Sheets

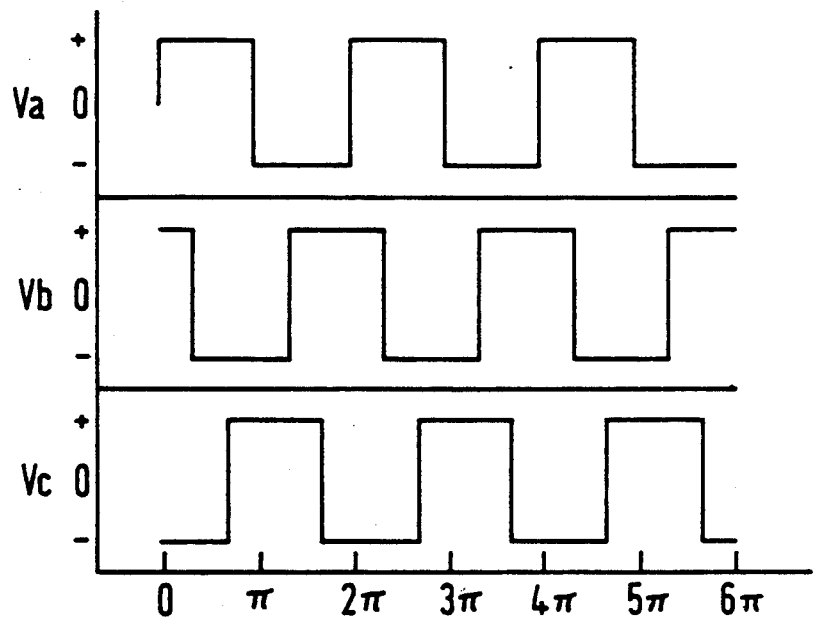
FIG. 14
FIG. 15
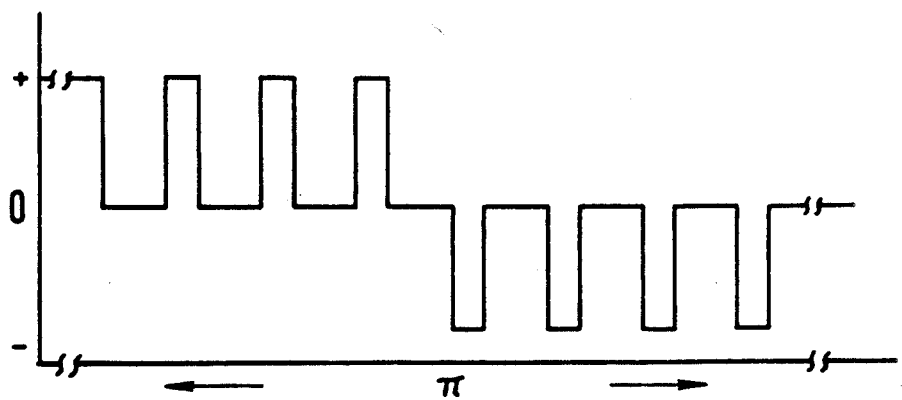
FIG. 16

D. C. ELECTRIC MOTOR

This is a continuation of co-pending application Ser. No. 07/052,045 filed as PCT GB86/00501 on Aug. 22, 1986, published as WO87/01247 on Feb. 26, 1987, now U.S. Pat. No. 4,873,463.

The present invention relates to a d.c. motor.

D.C. motors require commutation i.e. the process of reversing the current in each armature coil. This is carried out while the commutator segments to which the coil is connected are short-circuited by a brush. Very high rates of change of current are involved, which change is opposed in conventional d.c. motors by the inductive e.m.f. induced in the coil. If the reversal is not completed by the time that the short-circuit is removed, then sparking will occur with consequential damage to the brushes and the commutator itself.

It is known to assist commutation by the provision of extra poles (or compoles) located between the main poles of the stator. These compoles are arranged so as to induce an e.m.f. in the short-circuited coils which opposes, and therefore acts in a direction to neutralise, the induced e.m.f. Even with the aid of compoles, sparkless commutation cannot be achieved in conventional d.c. motors unless the inductive e.m.f. is limited to about 10 volts per coil and the mean voltage between adjacent commutator segments does not exceed about 20 volts. These factors impose considerable limitations on the design of conventional d.c. motors.

Shunt connected d.c. motors produce a relatively low torque and series connected d.c. motors are used for high torque. However, series connected motors suffer from very poor speed regulation and reduced efficiency owing to the increased $I^2R$ losses in the series field coils.

An object of the present invention is to provide a d.c. motor in which the above problems associated with commutation are overcome and which will provide high torque with good speed regulation.

In accordance with this invention as seen from one aspect there is provided a d.c. motor comprising a cylindrical stator, a rotor journalled on a shaft for rotation within the stator with a uniform gap between the rotor and stator as the rotor rotates, armature windings inserted in slots in a cylindrical surface on one of the stator and rotor and being divided into similar coils mutually spaced around the shaft axis, field generating means located on the other of said stator and rotor for forming poles mutually spaced around the shaft axis, and switching means adapted to connect said armature coils to a d.c. source in timed synchronism with rotation of the rotor such that switching of the d.c. to each armature coil occurs when a pole generated by that coil is substantially in alignment with a rotor (or stator) pole of opposite polarity and such that immediately before switching the e.m.f. induced in that armature coil is approaching maximum value and opposes the applied e.m.f. and immediately after switching those poles are of like polarity and the induced e.m.f. assists the applied e.m.f.

In accordance with this invention as seen from another aspect there is provided a d.c. motor comprising a cylindrical stator, a rotor journalled on a shaft for rotation within the stator with a uniform gap between the rotor and stator as the rotor rotates, armature windings inserted in slots in a cylindrical surface of the stator and being divided into similar coils mutually spaced around the shaft axis, field generating means located on the rotor for forming poles mutually spaced around the shaft axis, and switching means adapted to connect said armature coils to a d.c. source in timed synchronism with rotation of the rotor so as to generate a rotating field which is in arrear of and oposes the rotor field to exert a repelling force on the rotor poles.

The switched windings may be provided on the stator or on the rotor, i.e. either the stator or the rotor forms the armature. The field generating means may comprise windings divided into similar coils forming the field poles mutually spaced around the rotor (if the stator is the armature), or around the stator (if the rotor is the armature). Instead, the field generating means may comprise a permanent magnet.

In the motor in accordance with this invention, the induced e.m.f. due to relative movement of the field is used to assist commutation so that immediately before commutation the inducd e.m.f. reduces current to a minimum value whereby sparkless commutation can be obtained even with applied e.m.f.'s of high value (e.g. several hundred volts) and a voltage of high value (e.g. several hundred volts) between commutator segments.

Further, the induced e.m.f. also serves to increase the torque produced by the motor because immediately after commutation the induced e.m.f. assists the applied e.m.f. to increase the rate of increase of current and therefore magnetic flux which in turn produces a greater torque.

The stator and rotor fields are maintained in opposition to one another such that the e.m.f. induced in the switched winding due to a change in current is neutralised by the e.m.f. induced in the windings due to an equal and opposite change in the field flux linking the winding. Accordingly the normal inductive properties of the switched windings are obviated and these display essentially resistive characteristics.

U.K. patent specification No. 2028598A discloses a d.c. motor having a stator with two pairs of salient poles (in contrast to a cylindrical stator which forms a uniform gap with the rotor as the latter rotates): these salient stator poles are connected to a d.c. supply and switched so as to maintain a constant polarity sequence of N,N,S,S which advances around the poles in synchromism with the rotation of the rotor shaft. This motor is dependent for its operation upon the provision of the two pairs of salient poles and a substantial air gap between adjacent said poles and the maintaining of the N,N,S,S sequence in synchronism with the rotor rotation. The motor of U.K. patent specification No. 2028598A does not provide the above-described characteristics of the motor in accordance with the present invention and its speed is proportional to the sum of the unidirectional flux generated by the rotor and the alternating flux generated by the stator, whereas in the motor in accordance with the present invention the speed is proportional to the product of the rotor flux and the stator flux.

In known motors of the brushless d.c. type, typically 3-phase winding$ are provided on the stator and fed from the d.c. supply by a controller to generate a field which rotates ahead of the rotor and which therefore "pulls" the rotor around with it: e.g. the North pole of this field rotates ahead of the South pole of the rotor to exert a force of attraction on the rotor South pole. The rotating field generated by the stator and the rotor field therefore assist each other. In contrast, in the motor in accordance with the present invention, the field generated in the stator (when this is the armature) rotates in arrears of the rotor and therefore "pushes" the rotor around: e.g. the North pole of the stator field rotates in arrear of the North pole of the rotor to exert a force of repulsion on the rotor North pole. The rotating field generated by the stator and the rotor field therefore oppose each other. It can be shown that the energy required to energise the windings of the brushless d.c. motor (the fields assisting each other) to produce a given force on the rotor, is very much greater than the energy required to energise the windings of the motor in accordance with the present invention (the fields opposing each other). Also, in a brushless d.c. motor with 3-phase stator windings, at any instant only two windings are energised whilst the third must be disconnected from the supply and instead connected to a dissipating circuit for the purposes of commutation: in the motor in accordance with the present invention, it is not necessary for the winding being commutated to be de-energised and all windings can be energised all of the time, further increasing the available torque from the motor in comparison to a brushless d.c. motor of similar size. A further advantage of the motor in accordance with the invention is that if the load is increased, tending to slow the rotor, the rotating stator field will in effect move closer to the rotor field and increase its "pushing" force: whilst in the case of a brushless d.c. motor if the load is increased tending to slow the motor, the fields will move further apart and the "pulling" force consequently diminished.

In the motor in accordance with the present invention the means for connecting the armature coils to the d.c. source can be electronic or mechanical. If the stator forms the armature, the motor can conveniently include a mechanical commutator and slip rings connected in series between the stator coils and the d.c. source. If instead an electronic means is employed, the commutator, brushes and stator slip rings are replaced by rotor position sensing devices such as Hall effect or photodiodes. When a mechanical commutator is used, the commutator and slip ring assembly may be housed outside the machine and driven by gears or a timing belt or alternatively may be fitted to the shaft with provision for easy removal. In both cases the comutator and slip rings may be connected in one of two ways: the stator coils may be connected via brushes to the slip rings and the commutator to the d.c. source via brushes, or alternatively, the stator coils may be connected to the commutator via brushes and the slip rings connected to the d.c. source via brushes. In the latter case, the commutator is divided into as many segments as there are rotor poles and alternate segments are connected to two slip rings which connect to the d.c. source via brushes.

The stator windings may be connected in parallel, in series or in a series-parallel combination and the terminals connected to brushes evenly and sequentially distributed around the commutator. By this means the required magnetic polarity sequence is established and maintained sequentially in synchronism with rotation of the rotor.

A motor in accordance with the present invention has characteristics not found in known designs. For example, both speed and torque are directly proportional to the field current whilst in known designs the speed is inversely proportional to the field current.

The motor presents an essentially resistive load to the supply and this enables the use of an armature having a few large windings such as those used in conventional alternating current (a.c.) machines in contrast to conventional d.c. armatures which have a large number of small windings. Thus the d.c. motor can be designed using conventional and less expensive a.c. components, in particular a.c. type armatures. Doubly-excited a.c. machines such as three phase alternators, synchronous motors and brushless d.c. motors can easily be converted to d.c. motors in accordance with the present invention.

The reduced number of armature windings, three in the case of a three phase armature, allows the design of a rotating field d.c. motor. The reduced number of armature windings also allows the use of solid state switching devices instead of the conventional brushes and multisegment commutator.

A d.c. motor in accordance with the present invention, and having a permanent magnet field, would have similar constructional features to a conventional brushless d.c. motor. However, if the armature windings are wye-connected, current is applied to each phase for a complete cycle whilst in the case of conventional brushless d.c. motors current is applied for only two thirds of a cycle. Since current is applied for a complete cycle, the output power of a given machine arranged in accordance with the present invention is similar to that of a comparable conventional d.c. motor and some one and a half times greater than a brushless d.c. motor operating in the conventional manner.

Embodiments of the present invention will now be described by way of examples only and with reference to the accompanying drawings, in which.

Figure 1:
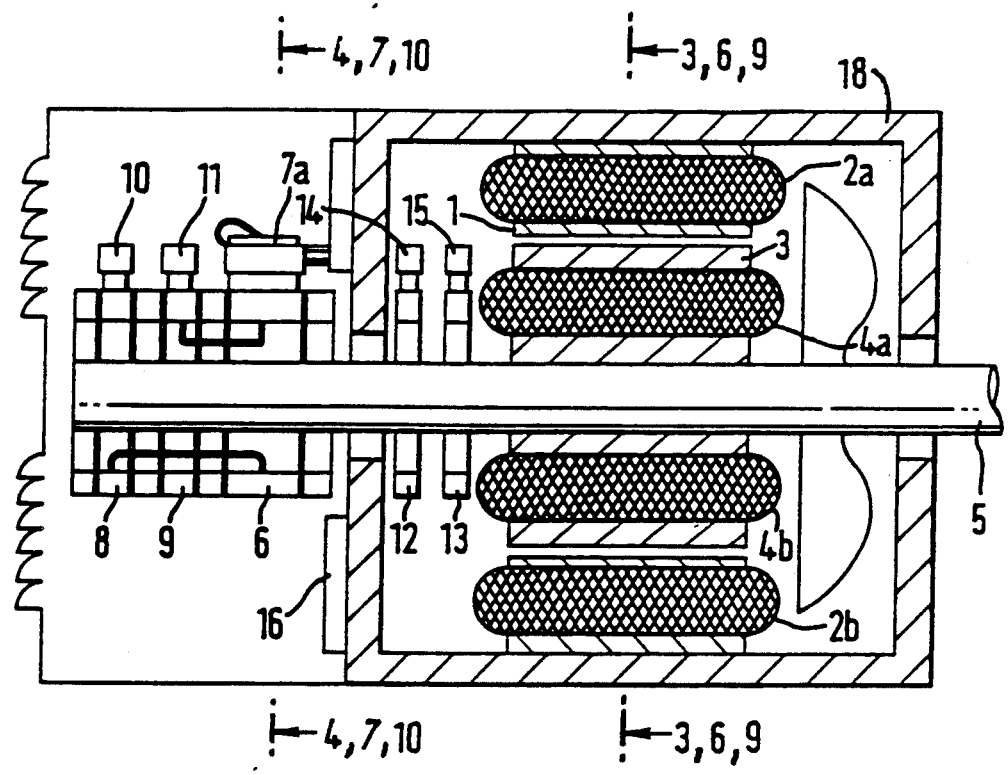
FIG. 1 is a diagrammatic longitudinal section through an embodiment of a d.c. motor in accordance with the present invention.
Figure 2:
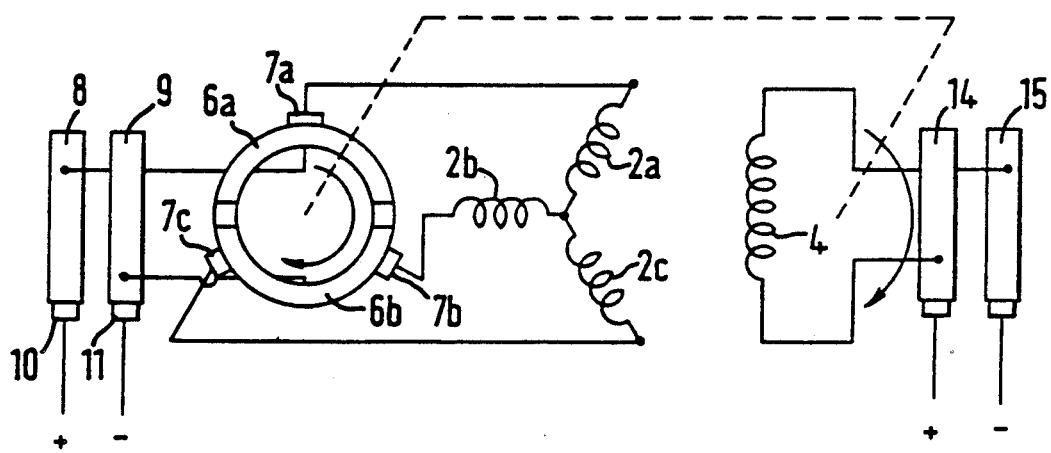
FIG. 2 is a schematic diagram of the electrical connections of the motor of FIG. 1.
Figure 3:
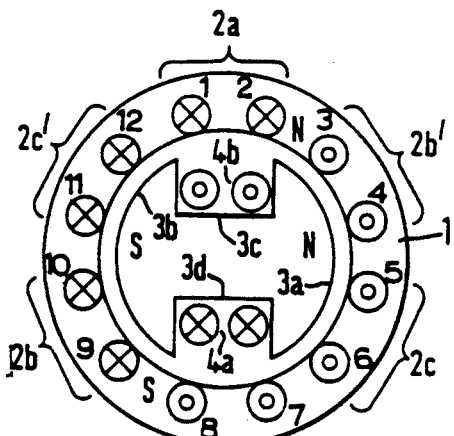
Figure 4:
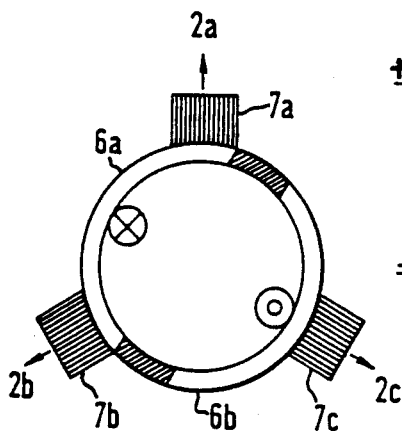
Figure 5:
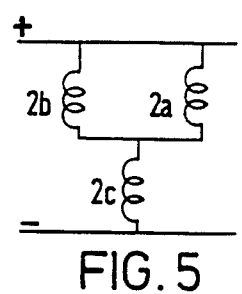
Figure 6:
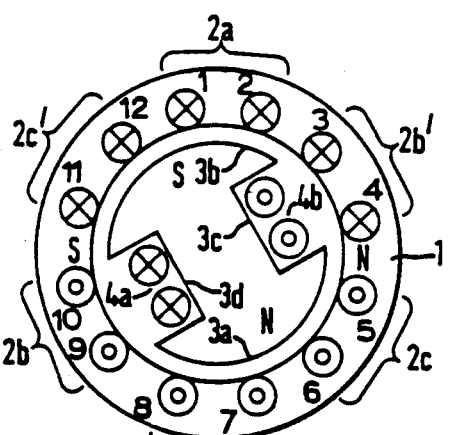
Figure 7:
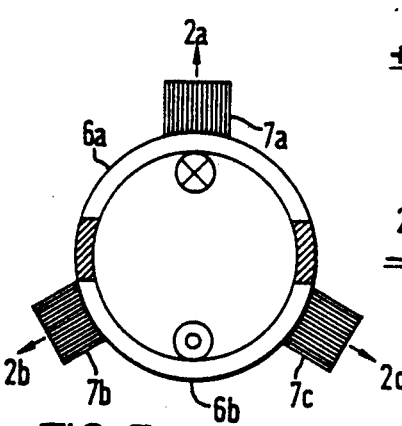
Figure 8:
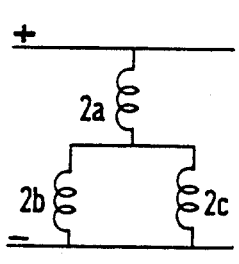
Figure 9:
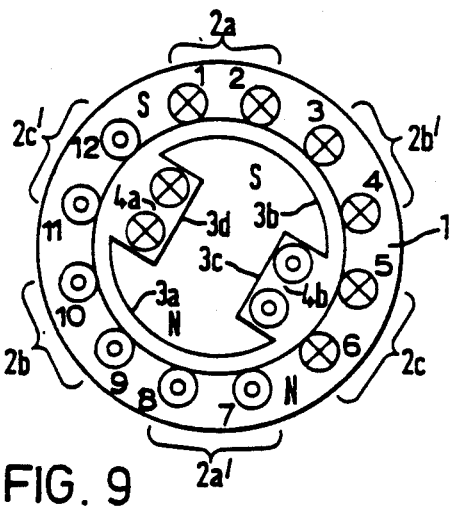
Figure 10:
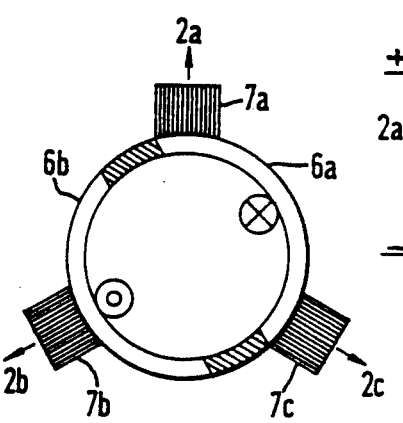
Figure 11:
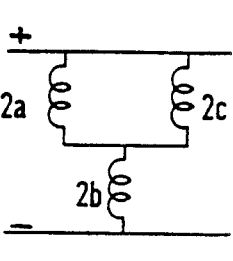
Figure 12:
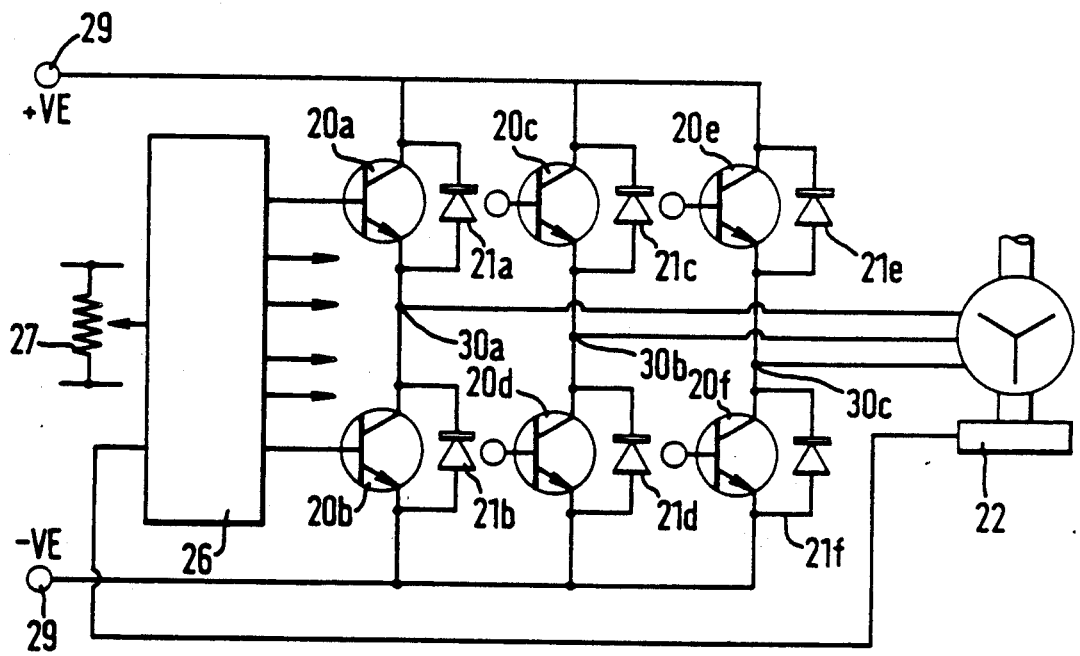
Figure 13A:
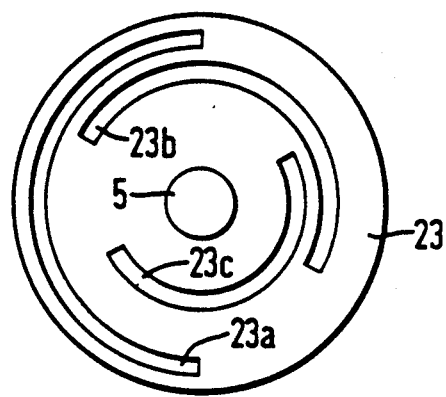
Figure 13B:
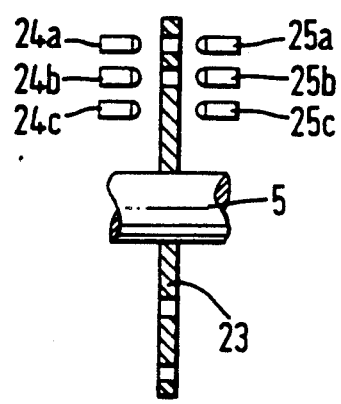

FIGS. 3, 6, and 9 are diagrammatic sections on the line A—A in FIG. 1, showing the rotor in three different positions;

FIGS. 4, 7, and 10 are diagrammatic sections on the line B—B in FIG. 1, corresponding to the rotor positions of FIGS. 3, 5, and 7 respectively;

FIGS. 5, 8 and 11 are schematic diagrams of the electrical connections of the armature windings corresponding to the rotor positions of FIGS. 3, 5 and 7 respectively;

FIG. 12 is a schematic diagram of a transistor inverter to replace the commutator and brushes assembly of the motor shown in FIGS. 1 to 11;

FIG. 13a is an end view of a disk component of a rotor position sensor used with the inverter of FIG. 12:

FIG. 13b is a section through the disk and showing also l.e.d. and photodiode pairs;

FIG. 14 is a graph of the waveforms at output terminals of the inverter;

FIG. 15 is a table of the switch sequence of the power transistors of the inverter; and FIG. 16 is a graph of the output of the inverter when variable pulse width is used to control the motor.

CONSTRUCTION

Referring to FIGS. 1 and 3 of the drawings, there is shown a d.c. motor comprising a laminated cylindrical stator core 1, with semi-enclosed slots to accomodate windings, and formed of steel sheets riveted or seam-welded together. A salient pole rotor 3 is journalled on a shaft 5 to rotate within the cylindrical stator, rotor 3 having acurate ends 3a, 3b of diameter slightly less than that of the stator (exaggerated in FIG. 3). The rotor also has parallel flat side surfaces 3c, 3d around which a rotor winding is wound whereby the rotor can be magnetically polarised along its longer transverse axis.

The rotor illustrated in FIG. 3 has two poles but the motor could be constructed with any desired number of poles, in which case the rotor could also be of cylindrical construction with slots to accommodate the rotor windings. Further variations in rotor construction include the "claw" type and the rotor could be a permanent magnet.

The stator forms the armature and is provided with windings 2a, 2b, 2c inserted into slots in the stator core so as to form similar magnetic poles or phases evenly distributed around the stator. In the example illustrated in FIG. 3, a 12-slot stator is wound with three single layer windings consisting of two full pitch coils in two slots per pole per phase.

It will be appreciated that the construction described thus far is identical in principle to that of a conventional a.c. alternator.

The terminals of the armature windings are connected to brushes 7a, 7b, and 7c with the start of winding 2a connected to brush 7a, the start of winding 2b connected to brush 7b and the start of winding 2c connected to brush 7c. The finish of the windings are connected together in a wye-configuration, however the windings may instead be connected in a delta configuration.

The stator windings shown in the example produce three phases, however, in other embodiments any number of phases may be used. Alternatively, the three phases could be produced from six windings with the same result. There are several known types of star-connected three phase windings of either the distributed (sinusodial) or concentrated (trapezodial) form which can be used in the motor.

The rotor winding 4 is connected to a pair of slip rings 12 and 13 (FIGS. 1 and 2) which connect with brushes 14 and 15 connected, in use, to a d.c. source to provide the field.

Also, a commutator 6 (FIGS. 1 and 2) is fixed to the shaft 5 and a second pair of slip rings 8 and 9 are provided which connect with brushes 10 and 11 connected to the d.c. source. The commutator in this embodiment is divided into two segments 6a and 6b, segment 6a being connected to slip ring 8 and segment 6b being connected to slip ring 9. Stator brushes 7a, 7b, and 7c are fixed to an insulated support plate 16 (FIG. 1) arranged so that the brushes are distributed evenly round the commutator in approximate alignment with the stator poles, the brush support plate being angularly adjustable relative to the stator so as to allow limited movement around the commutator for final adjustment of the commutation position.

In the present embodiment, the commutator is divided into as many segments as there are rotor poles. Alternatively, since the commutator and slip rings are in series between the d.c. source and the stator windings, the latter windings can be connected via brushes to three slip rings, in which case the commutator is divided into the number of phases, three in this example.

The commutator and slip rings effectively convert the d.c. input from the supply to a.c. in synchronism with and in phase with rotation of the rotor poles. It will be appreciated that this task could equally well be performed by electronic means.

OPERATION

The basic operation of the illustrated motor is as follows. Consider the rotor winding 4 (FIG. 3) connected to a d.c. source so that the right hand pole 3a of the rotor, as illustrated in FIG. 3, is a North pole and the left hand pole 3b is a South pole, the commutator segments 6a and 6b (FIG. 4) being connected to the d.c. source such that segment 6a is permanently connected to the positive terminal and segment 6b to the negative terminal.

The brushes 7a, 7b and 7c are located at positions substantially central of the stator windings 2a, 2b and 2c respectively. The latter windings are connected in a wye-configuration with the start of winding 2a connected to brush 7a, the start of winding 2b connected to brush 7b, the start of winding 2c connected to brush 7c and the finish of all three windings connected together.

At the instant illustrated in FIGS. 3 and 4, the start of winding 2a is connected to the positive segment 6a via brush 7a, and the start of winding 2c is connected via brush 7c to the negative segment 6b. Windings 2a and 2c are therfore connected in series across the d.c. supply as illustrated in FIG. 5. Similarly, the start of winding 2b is connected to the positive segment 6a via brush 7b and therefore winding 2b is also connected in series with winding 2c across the d.c. supply.

The resulting current distribution around the stator at this instant is illustrated in FIG. 3. The conductors of winding 2a in slots 1 and 2 carry current into the plane of the paper and the return conductors are in slots 7 and 8. The conductors of winding 2b in slots 9 and 10 carry current into the plane of the paper and the return conductors are in slots 3 and 4. The start of winding 2c is connected to the negative terminal of the supply so that the direction of current in winding 2c is reversed compared with the other two windings so that the conductors of winding 2c carrying current into the plane of the paper are in slots 11 and 12 and the return conductors are in slots 5 and 6.

At this instant therefore the conductors on one half of the stator carry current in one direction and conductors on the other half carry current in the opposite direction which results in the formation of two stator magnetic poles, a North magnetic pole in the region between slots 2 and 3 and a South magnetic pole in the region between slots 8 and 9: these are indicated by reference N between slots 2 and 3 and reference S between slots 8 and 9.

At the instant illustrated in FIGS. 3 and 4 the rotor poles are about 120 degrees out of alignment with the stator poles and there will therefore exist a rotational torque on the rotor in a direction which would result in the alignment of the fields i.e. the stator North pole in alignment with the South pole of the rotor and the stator South pole in alignment with the North pole of the rotor. At this instant, therefore, the stator North pole exerts a force of repulsion on the North pole of the rotor producing a clockwise torque on the rotor and similarly the stator South pole will exert a force of repulsion on the South pole of the rotor which again produces a torque in the clockwise direction on the rotor.

After a clockwise rotation brush 7b breaks contact with the positive segment 6a and makes contact with the negative segment 6b as illustrated in FIG. 7. At the instant depicted in FIGS. 6 and 7 therefore, the start of winding 2b is connected to the negative terminal of the supply via brush 7b as illustrated in FIG. 8 and the direction of current in the slots housing winding 2b is reversed so that the conductors in slots 3 and 4 carry current into the plane of the paper and slots 9 and 10 carry the return conductors. The direction of current in the remaining slots is unchanged.

The distribution of current around the stator is again such that the conductors on one half carry current in one direction and the conductors on the other half carry current in the opposite direction so that two magnetic poles are formed but at this instant the stator North pole is located in the region between slots 4 and 5 and the stator South pole in the region between slots 10 and 11 as illustrated in FIG. 6. The stator field has therefore advanced in a clockwise direction so that the rotor poles are again about 120 degrees out of alignment with the stator poles and again the stator North pole exerts a force of repulsion on the North pole of the rotor producing a torque in the clockwise direction and similarly the stator South pole exerts a force of repulsion on the South pole of the rotor again producing a torque in the clockwise direction.

With further clockwise rotation brush 7c breaks contact with the negative segment 6b and makes contact with the positive segment 6a as illustrated in FIG. 10. At the instant depicted in FIG. 10 therefore, the start of winding 2b is connected to the positive terminal of the supply via brush 7c as illustrated in FIG. 11 and the direction of current in the slots housing winding 2c is reversed so that conductors in slots 5 and 6 (FIG. 9) carry current into the plane of the paper and slots 11 and 12 contain the return conductors.

The distribution of current around the stator is again such that the conductors on one half carry current in one direction and those on the other half carry current in the opposite direction so that two magnetic poles are formed but, at the instant depicted in FIGS. 9 and 10, the stator North pole is located in the region between slots 6 and 7 and the stator South pole is located in the region between slots 1 and 12. The stator field has therefore advanced further in a clockwise direction so that the rotor poles are again some 120 degrees out of alignment with the stator poles and again the stator North and South poles exert forces of repulsion on the North and South poles, respectively of the rotor producing a torque in the clockwise direction.

With continued rotation in the clockwise direction brush 7a breaks contact with the positive segment 6a and makes contact with the negative segment 6b and the above cycle is repeated but with opposite polarities.

It will accordingly be seen that torque is produced from the force of repulsion between two magnetic fields, a rotating magnetic field being produced in the stator which is used to "push" the rotor around. This effect is in direct contrast to brushless d.c. motors in which torque is produced from the force of attraction between two magnetic fields and the rotor is "pulled" around by the rotating stator field.

It will be noted in particular that the two fields are always maintained in opposition to one another, i.e. the phase difference is maintained between 90° and 180° and this provides the unique performance characteristics of the motor. Since the two fields are always in opposition a change in one is accompanied by an equal and opposite change in the other: if one field expands the other must contract and conversely if one field contracts the other must expand.

When the field produced by a winding expands the resulting induced e.m.f. opposes the applied e.m.f. and conversely when the field contracts, the induced e.m.f. assists the applied e.m.f. In the d.c. motor being described, an increase in the stator current which would cause an increase in the field produced by the stator winding would also be accompanied by an equal reduction in the rotor flux linking the stator winding and similarly a reduction in stator current would cause a decrease in stator flux and an increase in the rotor flux linking the stator winding.

The e.m.f. induced in the stator winding due to a change in stator flux is therefore equal and opposite to the e.m.f. induced in the winding due to a change in the rotor flux linking that winding so that the algebraic sum of the induced e.m.f.s due to a change in stator current is zero: consequently the motor presents an essentially resistive load to the supply. This characteristic of the motor allows current to the stator windings to be switched at any point on the cycle without producing the high inductive e.m.f.s which are normally produced when large inductors are switched.

The inductive e.m.f. induced in the stator windings due to movement of the rotor are not similarly neutralised. The instant immediately after commutation of winding 2a is illustrated in FIG. 3: the magnetic field which would be produced by stator winding 2a alone would have a North pole between slots 4 and 5 and a South pole between slots 10 and 11, i.e. 180 degrees out of phase with the rotor poles at that instant so that the induced e.m.f. due to a change in rotor position is a maximum in the direction which assists the applied e.m.f. The start of winding 2a remains connected to the positive terminal of the supply until the rotor has completed one half revolution at which instant the rotor poles are again in alignment with the stator North and South poles that would be produced by winding 2a alone: the e.m.f. induced in stator winding 2a is now a maximum in the direction which opposes the applied e.m.f.

The e.m.f. induced in the stator windings due to movement of the rotor is therefore a maximum in a direction which assists current at the beginning of a cycle and a maximum in a direction which opposes current at the end of a cycle. Immediately after commutation therefore, the growth of current and consequently of stator flux, is assisted by the induced e.m.f. and at the end of a cycle the induced e.m.f. opposes the applied e.m.f., to reduce current and therefore assist commutation. Accordingly sparkless commutation can be achieved with inductive e.m.f.s of several hundred volts and several hundred volts between segments.

Producing torque from the reaction between two opposing magnetic fields provides another effect. Consider an increase of the field current and consequently of the rotor flux: there will be a reduction in stator current owing to the contraction of the stator field but the force exerted on the fields will be greater because of the additional rotor flux. There will therefore be a decrease in stator current and the additional force will either cause an increase in speed if the torque is maintained constant or an increase in torque if the speed is maintained constant. The motor therefore has the characteristic that both speed and torque are proportional to field current. The stator input current, however, is inversely proportional to field current and it therefore follows that the efficiency is also proportional to the field current.

At the end of a cycle the e.m.f. induced in a stator winding due to a change in rotor position opposes the applied e.m.f. and an increase in field current will also increase the e.m.f. at this part of the cycle. After a further increase in field current a point is reached when the e.m.f. induced in the stator winding exceeds the applied e.m.f. over a portion of the cycle and the machine behaves as a generator and this effect limits the speed of the motor. However, the e.m.f. induced as a result of a change in rotor position can be reduced by increasing the load and thereby decreasing the speed and consequently the e.m.f. induced in the winding to movement of the rotor.

ELECTRONIC COMMUTATION

The commutator and brushes of the motor so far described convert the d.c. supply to an alternating supply in phase and in synchronism with rotation of the rotor and the waveforms appearing at the commutator brushes 7a, 7b and 7c are illustrated by Va, Vb and Vc respectively in FIG. 14. The same waveforms can equally well be produced by an electronic means, an example of which will now be described.

Referring to FIGS. 12 and 13, the commutator and brushes assembly is replaced by a rotor position sensing transducer 22 comprising a disc 23 fixed to the shaft 5. The disc has three slots 23a, 23b and 23c corresponding to the magnetic poles produced by the stator windings. In this example there are three rows of slots corresponding to three phases and one slot per row corresponding to the number of pairs of rotor poles. Each slot has a span of 180 degrees which again is determined by the number of pairs of stator poles. A four pole motor, for example, would have two slots per row with each slot having a span of 90 degrees.

The transducer 22 further comprises a light emitting diode (l.e.d.) and photo diode pairs 24a and 25a, 24b and 25b, and 24c and 25c (FIG. 13) positioned such that the light emitted from the l.e.d.s 24a, 24b and 24c pass through the slots in the disc 23 and illuminate the photo-diodes 25a, 25b and 25c respectively. An alternative arrangement would be to distribute the emitting and photo diode pairs around the disc in positions corresponding to the positions of brushes 7a, 7b and 7c around the commutator, in which case only one row of slots would be required on the disc.

The signals from the photodiodes are processed by an electronic circuit 26 in FIG. 12 and used to switch six solid state power switching devices 20a, 20b, 20c, 20d, 20e and 20f which connect the motor armature windings to the terminals of the d.c. source. The start of armature winding 2a is connected to terminal 30a which connects with the transistor pair 20a and 20b, armature winding 2b is connected to terminal 30b which connects with the transistor pair 20c and 20d and armature winding 2c is connected to terminal 30c which connects with the transistor pair 20e and 20f.

In this example, when light falls on any given photodiode, the associated power transistor connected to the positive terminal of the supply is switched on and the transistor connected to the negative terminal is switched off: otherwise the transistor connected to the negative terminal of the supply is switched on and the transistor connected to the positive terminal is switched off.

At the instant depicted in FIG. 13, light from l.e.d. 24a passes through slot 23a to illuminate photodiode 25a and the resulting signal from the photodiode is used to turn on transistor 20a which connects the start of stator winding 2a to the positive terminal of the supply. Similarly, the light from l.e.d. 24b passes through slot 23b to illuminate photodiode 25b and switch on transistor 20c to connect the start of stator winding 2c to the positive terminal of the supply. The light from l.e.d. 24c is blocked by the disc because slot 23c is not in alignment and therefore transistor 20f is switched to connect the start of winding 2c to the negative terminal of the supply. The instant depicted in FIG. 13 is therefore equivalent to that depicted in FIGS. 3, 4 and 5 and a clockwise rotation of the rotor will produce the same switching sequence as the commutator and brushes as illustrated in the Table of FIG. 15.

The motor presents an essentially resistive load to the supply and in the electronically commutated example this feature can be utilised to provide an improved motor control system. To vary the speed of a d.c. motor over a wide range it is necessary to vary the supply voltage and the most efficient method of voltage control is to use a pulsed technique whereby the controlling element is either in the on state or off so that, unlike a resistor for example, the power lost in the switching device is a minimum and the average output voltage is then proportional to the mark-space ratio. In conventional brushless d.c. motor and synchronous motor control systems the mark-space ratio is modulated over one cycle to produce a quasisine waveform (pulse-width modulation—p.w.m.). However, in the motor described herein such a waveform would be inefficient and seriously degrade the performance mainly because of the low voltage value at the beginning of the cycle which would reduce the rate of increase of current, the peak value of the current and the average value of the torque produced by the motor.

One method of controlling the d.c. supply to the motor described herein is to use a switched-mode system whereby the signal to the power switching devices consist of a series of pulses with a variable mark space ratio as illustrated in FIG. 16, showing four pulses either side of the instant of commutation. It will be appreciated that the greater the number of pulses per cycle the finer the degree of control. In conventional p.w.m. systems providing a high degree of control, the modulating frequency is in the audible range which is undesirable and, because of the necessity to vary the modulation over a cycle, the use of higher frequencies is complicated and expensive. In the motor control system shown in FIG. 12, for a given adjustment of a mark-space ratio control 27, the mark-space ratio is constant over the whole cycle and this allows the use of much higher frequencies, preferably in the ultrasonic range, thereby overcoming the objectionable noise generated in conventional p.w.m. systems.

PERFORMANCE

Conventional three phase doubly excited machines such as alternators, brushless d.c. motors and synchronous motors are readily converted to d.c. motors in accordance with the present invention and this feature is useful in comparing the performance of one machine with another. In a conventional d.c. motor the power converted to magnetic energy is given by:

$$P_{ELEC} = E\ I\ Watts \quad (1)$$

where E is the open circuit e.m.f. at a given speed and I is the armature current. In the case of a three-phase machine this becomes:

$$PELEC = E I 3\tfrac{1}{2} \text{ Watts} \qquad (2)$$

In the case of a permanent magnet field or a constant field current the open circuit e.m.f. is proportional to speed and if the speed is expressed in radians per second (w) a useful constant ($K_E$) for a given machine can be derived:

$$K_E = E/w \text{ Volts/rad}^{-1}\text{sec}^{-1} \qquad (3)$$

Substituting for E in equation (2):

$$PELEC = (K_e\ w) I 3\tfrac{1}{2} \text{ Watts} \qquad (4)$$

The mechanical output power is given by:

$$PMECH = w T \text{ Watts} \qquad (5)$$

where T is the torque and, neglecting losses, the mechanical power is equal to the electrical power so that:

$$w T = K_E w I 3\tfrac{1}{2}$$

Dividing by w gives:

$$\text{Torque } T = K_E 3\tfrac{1}{2} I \text{ Nm} \qquad (6)$$

From equation (6) it can be seen that the electrical constant $K_E$ can also have mechanical units and is often referred to as the torque constant or torque sensitivity and in three phase machines the constants are related thus:

$$K_T = K_E 3\tfrac{1}{2} \qquad (7)$$

and in d.c. machines $K_E = K_T$ so that in all cases:

$$\text{Torque } T = K_T I \text{ Nm} \qquad (8)$$

The performance characteristics of the motor in accordance with the present invention, when the armature windings are connected in wye-configuration, therefore compare with conventional d.c. motors but in the case of inverter driven synchronous motors and brushless d.c. motors current is applied for only two-thirds of a cycle and consequently the effective electrical constant ($K_E$) is reduced by about $3\tfrac{1}{2}$. Further the performance characteristics of the motor in accordance with the present invention are the same as those of conventional d.c. motors with the exception that both speed and torque are directly proportional to the field current whilst in conventional d.c. motors speed is inversely proportional to the field current.

The motor of the present invention has utility in vehicle steering systems and is believed to be of advantage in such usage because of the possibility of achieving a high torque output for a small sized motor unit. An example of a vehicle steering gear illustrating the manner in which the d.c. motor may be incorporated in a steering unit is disclosed in EP 0 101 579.

I claim:

1. A d.c. motor which is energizable by a d.c. electrical source, said motor comprising:
   a stator core having a cylindrical shaped inner surface;
   a rotor journalled on a shaft for rotation within the cylindrical shaped inner surface of the stator core, said shaft having an axis;
   armature windings inserted in slots in the stator core and being divided into similar armature coils mutually spaced about said shaft axis;
   said rotor including field generating means providing magnetic rotor poles mutually spaced about the shaft axis and serving to induce an e.m.f. in each armature coil during rotation of the rotor, said rotor being adapted such that the associated radial distance between each magnetic rotor pole and the inner surface of the stator core remain substantially constant as the rotor rotates; and
   switching means adapted to connect said armature coils to a d.c. source so as to apply an e.m.f. to each armature coil in timed synchronism with rotation of the rotor such that (i) switching of the d.c. to an armature coil occurs when a pole generated by that coil is substantially in alignment with a magnetic rotor pole of opposite polarity, (ii) immediately before switching, the e.m.f. induced in that armature coil is approaching a maximum value and opposes the applied e.m.f., and (iii) immediately after switching, that armature pole and the magnetic rotor pole are of like polarity and the induced e.m.f. assists the applied e.m.f., said armature windings providing a rotating field which is in arrear of and opposes the rotor fields so as to exert a repelling force against the rotor poles.

2. The d.c. motor of claim 1 wherein the field generating means of the rotor includes windings and means for providing d.c. current to those windings so as to provide said magnetic rotor poles.

3. The d.c. motor of claim 1 wherein the field generating means of the rotor includes a permanent magnet which provides said magnetic rotor poles.

4. The d.c. motor of claim 1 wherein said switching means includes a mechanical commutator and slip rings connected in series between the armature windings and the d.c. source.

5. The d.c. motor of claim 1 wherein said switching means includes a device for sensing rotor position and controlling an electronic means which switches the d.c. source to the armature windings.

6. The d.c. motor of claim 1 wherein said electronic control means includes power switching devices and means supplying a pulse train to control the power switching devices, in which pulse train the mark-space ratio is adjustable but, for a given adjustment, is constant over the whole cycle.

7. The d.c. motor of claim 1 wherein said rotor includes arms radially projecting from and mutually spaced around said shaft axis, each arm having an arcuate end of diameter slightly less than that of the cylindrical shaped inner surface of the stator core such that a uniform air gap exists between each of the rotor ends and the cylindrical surface of the stator cores as the rotor rotates, each rotor being a magnetic pole.

8. A d.c. motor which is energizable by a d.c. electrical energy source, said motor comprising a stator having a cylindrical shaped inner surface;
   a rotor journalled on a shaft for rotation within the cylindrical shaped inner surface of the stator, said shaft having an axis and the rotor including arms radially projecting from and mutually spaced around the shaft axis, each arm of the rotor having an arcuate end of diameter less than the diameter of the cylindrical inner surface of the stator so that a uniform gap is present between the arcuate ends of the rotor arms and the cylindrical inner surface of the stator as the rotor rotates;
   armature windings inserted in slots in the cylindrical surface of the stator and being divided into similar coils mutually spaced about the shaft axis;
   field generating means carried by the rotor for providing magnetic rotor poles at the ends of the rotor arms, each rotor arm providing an associated magnetic rotor pole and serving to induce an e.m.f. in each armature coil during rotation of the rotor; and switching means adapted to connect said armature windings in said slots of the stator to the d.c. source so as to apply an e.m.f. to each armature coil in timed synchronism with rotation of the rotor so as to generate a rotating field which is in arrear of and opposes the rotor fields so as to exert a repelling force against the magnetic poles.

* * * * *